US011328746B2

(12) United States Patent
Andruet et al.

(10) Patent No.: US 11,328,746 B2
(45) Date of Patent: May 10, 2022

(54) DOUBLE LOOP HEATER (71) Applicant: Seagate Technology LLC, Fremont, CA (US)

(72) Inventors: Raul Horacio Andruet, Woodbury, MN (US); Erik Jon Hutchinson, Eden Prairie, MN (US)

(73) Assignee: Seagate Technology LLC., Fremont, CA (US)

( * ) Notice: Subject to any disclaimer, the term of this patent is extended or adjusted under 35 U.S.C. 154(b) by 2 days.

(21) Appl. No.: 17/158,584

(22) Filed: Jan. 26, 2021

(65) Prior Publication Data
US 2021/0151074 A1 May 20, 2021

Related U.S. Application Data (63) Continuation of application No. 16/150,778, filed on Oct. 3, 2018, now Pat. No. 10,910,006.

(51) Int. Cl.
| *G11B 5/60* | (2006.01) |
| *G11B 5/48* | (2006.01) |
| *G11B 5/31* | (2006.01) |
| *G11B 5/39* | (2006.01) |
| *G11B 5/00* | (2006.01) |
| *G11B 5/02* | (2006.01) |

(52) U.S. Cl.
CPC .......... *G11B 5/607* (2013.01); *G11B 5/3133* (2013.01); *G11B 5/3967* (2013.01); *G11B 5/02* (2013.01); *G11B 5/4886* (2013.01); *G11B 2005/0021* (2013.01)

(58) Field of Classification Search
None
See application file for complete search history.

(56) References Cited

U.S. PATENT DOCUMENTS

| 7,068,468 | B2 | 6/2006 | Kamijima |
| 7,095,587 | B2 | 8/2006 | Kurita et al. |
| 7,190,543 | B2 | 3/2007 | Suk |
| 7,362,544 | B2 | 4/2008 | Shiramatsu et al. |
| 7,403,354 | B2 | 7/2008 | Pust et al. |
| 7,649,714 | B2 | 1/2010 | Kato et al. |
| 7,656,619 | B1 | 2/2010 | Yan et al. |
| 8,094,418 | B2 | 1/2012 | Schreck et al. |
| 8,284,521 | B2 | 10/2012 | Ohtsu |
| 8,520,339 | B2 | 8/2013 | Sonda et al. |
| 8,681,446 | B2 | 3/2014 | Hutchinson et al. |
| 8,760,808 | B2 | 6/2014 | Heim et al. |
| 8,810,962 | B2 | 8/2014 | Wu et al. |
| 9,058,829 | B1 | 6/2015 | Wolf et al. |
| 9,385,266 | B2 | 7/2016 | Cha et al. |
| 9,905,255 | B1 | 2/2018 | Ramakrishnan et al. |
| 2006/0193081 | A1* | 8/2006 | Pust et al. ............. G11B 5/314 360/128 |
| 2007/0035881 | A1* | 2/2007 | Burbank et al. ..... G11B 5/6064 360/234.3 |

(Continued)

*Primary Examiner* — Craig A. Renner
(74) *Attorney, Agent, or Firm* — Mueting Raasch Group (57) ABSTRACT An apparatus comprises a slider comprising an air bearing surface (ABS). The slider comprises a reader, a writer, and a reader heater. The reader heater is configured to cause a protrusion of the ABS proximate the reader, and the reader heater comprises a first planar loop and a second planar loop, wherein the first and second loops are in the same plane.

20 Claims, 8 Drawing Sheets

(56) References Cited

U.S. PATENT DOCUMENTS

2008/0019041 A1* 1/2008 Aoki .................... G11B 5/314
                                                       360/110
2017/0256275 A1* 9/2017 Hutchinson et al. .. G11B 5/314

* cited by examiner

DOUBLE LOOP HEATER

RELATED APPLICATIONS

This application is a continuation of U.S. patent application Ser. No. 16/150,778, filed Oct. 3, 2018, which is incorporated herein by reference in its entirety.

SUMMARY

Embodiments of the disclosure are directed to an apparatus comprising a slider having an air bearing surface (ABS). The slider comprises a reader, a writer, and a reader heater configured to cause a protrusion of the ABS proximate the reader. The reader heater comprises a first planar loop and a second planar loop, wherein the first and second loops are in the same plane.

Further embodiments are directed to an apparatus comprising a slider having an air bearing surface. The slider comprises a reader, a writer, and a reader heater configured to cause a protrusion of the ABS at the reader. The reader heater comprises a first loop having a first shape and a second loop having a second shape different from the first shape. The first and second loops are coplanar.

Additional embodiments are directed to an apparatus comprising a slider having an air bearing surface (ABS). The slider comprises a reader, a writer, and a reader heater configured to cause a protrusion of the ABS proximate the reader. The reader heater has a symmetrical shape about an axis of symmetry perpendicular to the ABS, and the reader heater comprises a first planar loop and a second planar loop wherein the first and second loops are in the same plane.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

The present disclosure is generally related to magnetic recording, and more specifically, reading magnetically recorded data. A read/write element, sometimes referred to as a slider, recording head, read head, write head, read/write head, etc., includes magnetic read and write transducers. For example, a magnetoresistive sensor reads data by detecting magnetic fluctuations of a magnetic media as it moves underneath the sensor. The reader components described herein (e.g., reader heater) are applicable to various magnetic recording techniques including perpendicular magnetic recording and heat-assisted magnetic recording (HAMR). However, as certain embodiments are directed to addressing factors associated with HAMR, HAMR is discussed in more detail below.

HAMR is also referred to as energy-assisted magnetic recording (EAMR), thermally-assisted recording (TAR), thermally-assisted magnetic recording (TAMR), etc. In a HAMR device, a source of optical energy (e.g., a laser diode) is integrated with a recording head and couples optical energy to a waveguide or other light transmission path. The waveguide delivers the optical energy to a near-field transducer (NFT). The NFT concentrates the optical energy into a tiny optical spot in a recording layer of a magnetic recording medium, which raises the medium's temperature locally, reducing the writing magnetic field required for high-density recording.

The magnetic read and write transducers of a HAMR slider are similar to those used in other hard drives, e.g., perpendicular recording drives. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path, such as a waveguide, is integrated into the HAMR slider to deliver the energy to the surface of the media.

The optical delivery path of a HAMR slider may include a plasmonic transducer proximate a media-facing surface (e.g., air-bearing surface (ABS), contact surface). The plasmonic transducer shapes and transmits the energy to a small region on the medium. The plasmonic transducer is sometimes referred to as a NFT, optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature ($T_C$) and having dimensions less than 100 nm (e.g., ~50 nm).

The heat generated during write operations can cause portions of the ABS, typically portions near the NFT and waveguide, to expand. Thermal resistive sensors can be positioned in/near this expansion area to detect whether the ABS contacts the recording media. Similarly, heat is generated during read operations to create a protrusion in the ABS thereby moving the read sensor element closer to the recording medium to improve the strength and reliability of the read signal. While a wider contact area provides a more controlled head to media spacing (and a more reliable read signal), it can also increase the temperature of the read sensor element due to slower heating and burnishing upon contact with the recording medium. Thus, the size of the contact area needs to be configured with respect to the temperature of the reader. Embodiments herein are directed to achieving a balance between the size/shape of the contact area and the read sensor element temperature using the shape of a reader heater.

The heat that forms the ABS protrusion at the reader is generated by a reader heater. The heater is positioned within the slider (e.g., recessed from the ABS) and proximate the read sensor element at the ABS. Using current reader heater designs having a single loop projecting toward the ABS, the higher the heater temperature, the lower the corresponding temperature of the read sensor element is. Also, the resistance of the reader heater is constrained by the pre-amp limit for the total circuit (heater, traces, and TGA), which is about 40-55 ohms. Using a dual parallel loop reader heater design reduces the electrical resistance of the heater as well as the temperature. Notably, the dual loop heater designs described herein generate a lower read sensor element temperature when generating a lower reader heater temperature. This is because current density is spread around the loops by dividing the input current into two different paths and the heat density is spread across more area. In certain embodiments, the dual loops also provide increased control over the contact area as one loop is designed to address stroke efficiency, and the other loop is designed to address the size/shape of the contact area. Although the dual loop reader heater designs may be used for any type of magnetic recording head, including perpendicular recording, they are described herein in the context of a HAMR slider.

Figure 1:
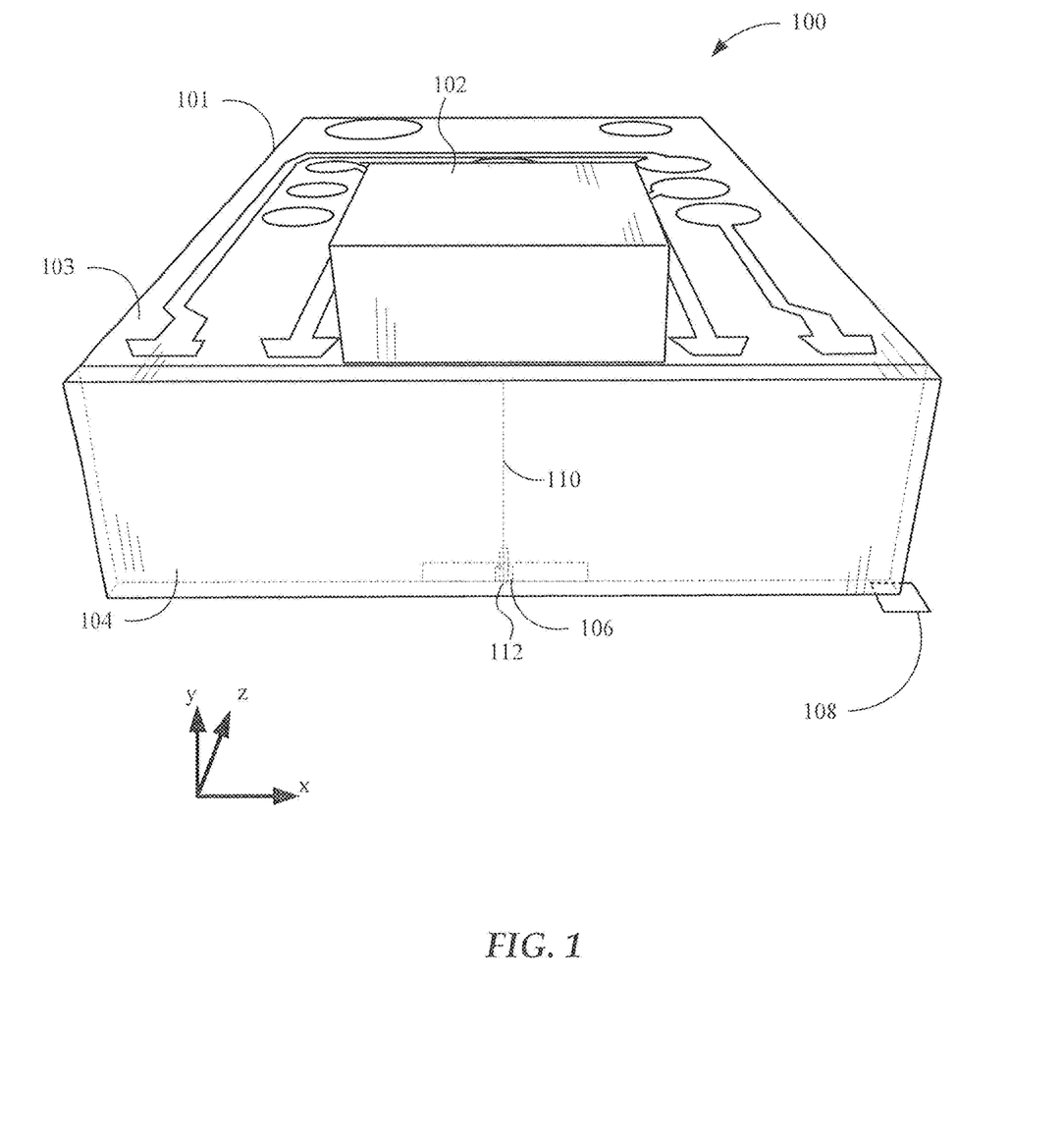
FIG. 1 is a perspective view of a HAMR slider assembly according to embodiments discussed herein.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite a media-facing surface 108 that is positioned over a surface of a recording media (not shown) during device operation. The media facing surface 108 faces, and is held proximate to, the moving media surface while reading and writing to the media. The media-facing surface 108 may be configured as an air bearing surface that maintains separation from the media surface via a thin layer of air.

The laser diode 102 delivers light to a region proximate a HAMR read/write head 106, which is located near the media-facing surface 108. The energy heats the recording media as it passes by the read/write head 106. Optical coupling components, such as a waveguide system 110, are integrally formed within the slider body 101 (e.g., near a trailing edge surface 104 of the slider) and function as an optical path that delivers energy from the laser diode 102 to the recording media via a NFT 112. The NFT 112 is proximate the writer of the read/write head 106 and causes heating of the media during recording operations.

The laser diode 102 may be configured as either an edge-emitting laser or surface-emitting laser. While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be externally mounted to the slider 100, and coupled to the slider by way of optic fiber and/or a waveguide. An input surface of the slider body 103 may include a grating or other coupling feature to receive light from the laser via the optic fiber and/or waveguide. The slider components proximate the air bearing surface (ABS) 108 are discussed further below.

Figure 2:
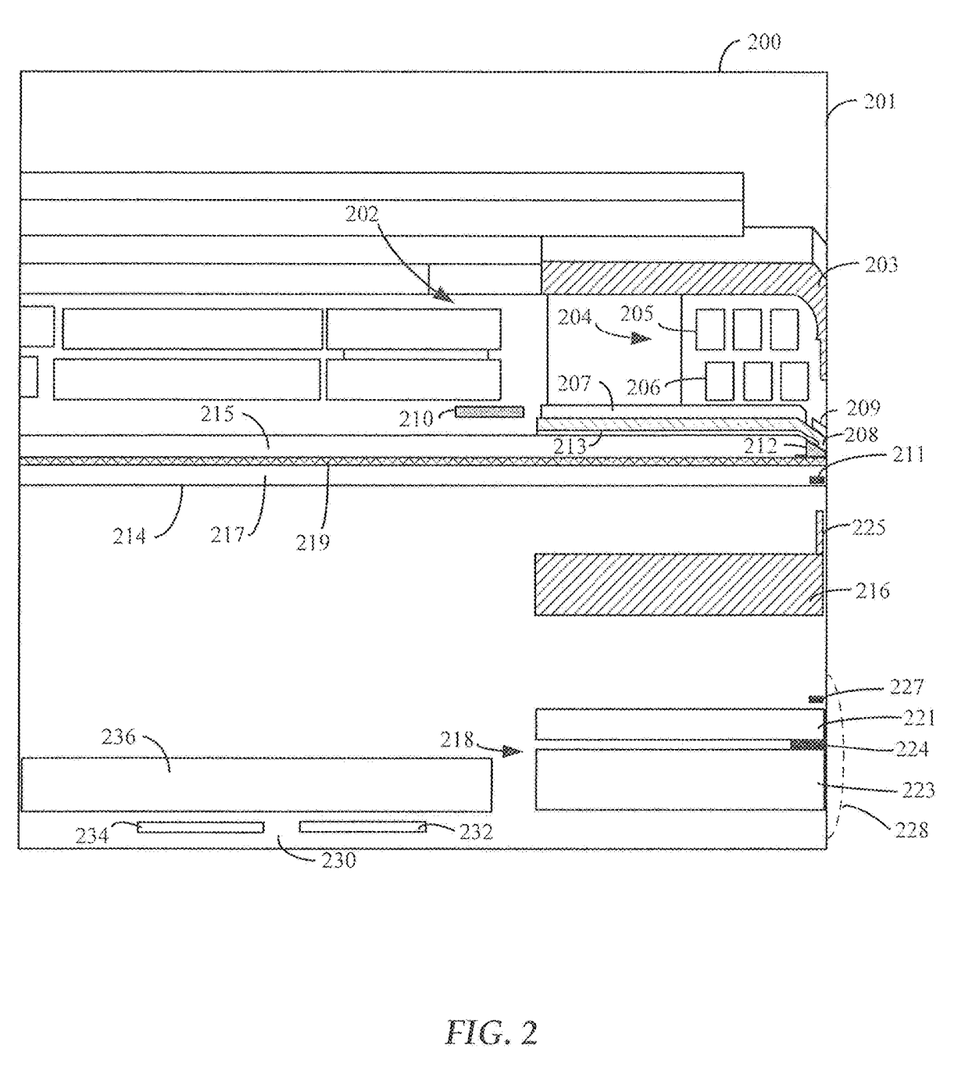
FIG. 2 is a cross-sectional view of a slider along a down-track plane, according to embodiments discussed herein.

In FIG. 2, a cross-sectional view illustrates portions of the slider body 200 near the media-facing ABS 201 in further detail according to various embodiments. A writer 202 includes a number of components, including a second return pole 203 proximate a write coil 204. The write coil 204 includes an upper coil 205 and a lower coil 206. The write coil 204 may conform to any writer coil design, including a double-pancake design, single-layer pancake design, or a helical coil design, for example.

The write coil 204 is configured to energize a write pole 208. A magnetic yoke 207 is disposed between the write coil 204 and the write pole 208. A write pole heat sink 209 is thermally coupled to the write pole 208. A writer heater 210 is positioned proximate the write pole 208 and is configured to thermally actuate the write pole 208 during write operations. An NFT 212 is situated proximate the write pole 208 and is optically coupled to an optical waveguide 214. The waveguide 214 includes an upper cladding layer 215, a lower cladding layer 217, and a core 219 between the upper and lower cladding layers 215, 217. A diffuser 213 thermally couples to the NFT 212 and extends between at least a portion of the write pole 208 and the upper cladding layer 215. The writer 202 also includes a leading shield 225 and a first return pole 216, which is magnetically coupled to the write pole 208 and the second return pole 203.

The slider 200 also includes a reader 218. The reader 218 includes a read element 224 (e.g., a GMR sensor) disposed between a pair of reader shields 221, 223. A reader heater 230 is located proximate the reader 218, which is configured to thermally actuate the reader 218 during read operations. The reader heater 230 is a dual loop heater having a first loop 232 and a second loop 234. Proximate the reader heater 230 is a push block 236, which helps control the shape and actuation efficiency within the slider 200 by distributing the heat generated by reader heater 230. The push block 236 distributes heat to the reader shields 221, 223, causing them to protrude toward the ABS 201, and toward a recording medium to create a protrusion 228. The protrusion 228 can create a corresponding contact area of the ABS 201 that contacts the medium.

The slider 200 includes several sensors. For example, a contact sensor 211 may be positioned at or near the ABS 201 in the waveguide cladding 217. At this location, the contact sensor 211 is arranged to detect contact between a close point of the writer 202 (when thermally actuated by one or more heating elements) and a magnetic recording medium. The slider 200 also includes a contact sensor 227 positioned proximate the reader 218. The contact sensor 227 is configured to detect contact between a close point of the reader 218 (when thermally actuated by one or more heating elements) and the recording medium. In some embodiments, the writer contact sensor 211 is coupled (in series or in parallel) to the reader contact sensor 227. In other embodiments, the writer and reader contact sensors 211 and 227 are independent of each other.

The contact sensors 211, 227 are typically thermal sensors having a temperature coefficient of resistance (referred to herein as TCR sensors, such as a differential-ended TCR sensor or DETCR). A DETCR sensor is configured to operate with each of its two electrical contacts or leads (ends) connected to respective bias sources provided by a pair of electrical bond pads of the slider. According to various embodiments described herein, the thermal sensor may be referred to as a contact sensor, a thermal asperity sensor, a laser power monitor, and/or a DETCR. The TCR sensors 211, 227 are configured to sense changes in heat flow for detecting onset of head-medium contact. Thus, the reader contact sensor 227 is positioned within the protrusion area 228 and proximate the read element 224. The reader heater 230, which generates heat flow proximate the reader and the protrusion area 228, is described further below.

Figure 3A:
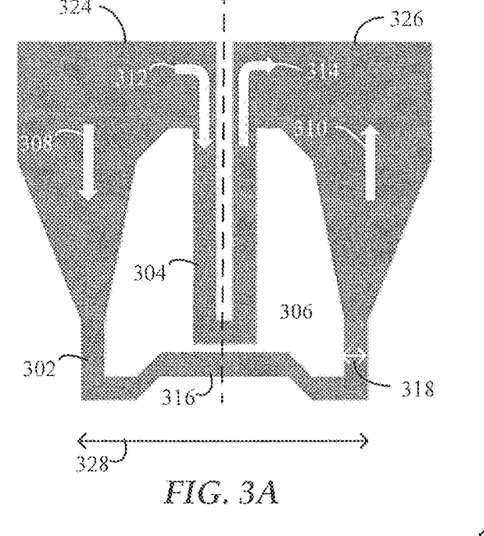
FIG. 3A is a plan view of a double loop reader heater according to embodiments discussed herein.
Figure 3B:
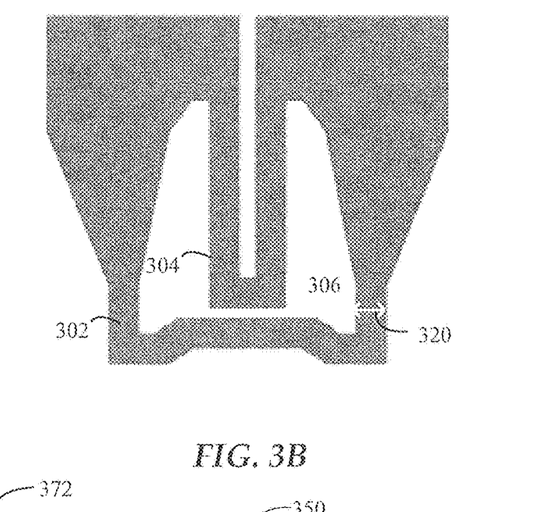
FIG. 3B is a plan view of a double loop reader heater according to embodiments discussed herein.
Figure 3C:
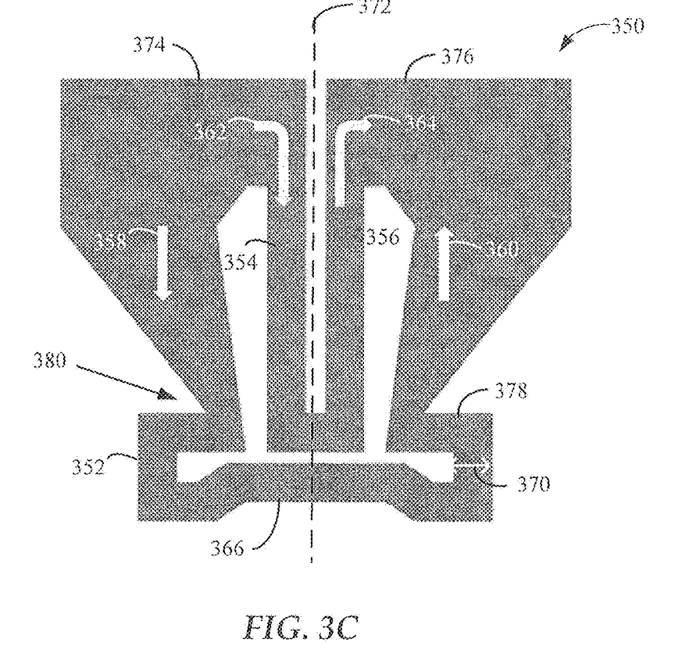
FIG. 3C is a plan view of a double loop reader heater according to embodiments discussed herein.

FIGS. 3A-C illustrate double loop reader heater configurations according to various embodiments. As discussed above, a dual branch (or loop) heater design reduces the resistance of a reader heater. In certain embodiments, the dual loops have a parallel resistor configuration and are typically used in HAMR recording. As shown in FIG. 3A, a reader heater 300 comprises a first loop 302 positioned around a second loop 304 such that the second loop 304 is located within the first loop 302. While the reader heater 300 is a three-dimensional element of the slider, the heater 300 as well as both of the first and second loops 302, 304, are planar (i.e., flat and lying in one plane) and both the first and second loops 302, 304 are positioned in the same plane. The loops 302, 304 create an open space between them 306. The parallel loops 302, 304 are also symmetrical about an axis 322 substantially perpendicular to the ABS. Thus, a left portion 324 of FIG. 3A is shown as a mirror image of a right portion 326. In certain embodiments, the axis of symmetry 322 is positioned substantially centered over the read element of the slider.

The reduction in resistance occurs due to the division of the current supplied to the reader heater 300 into two paths through the first and second loops 302, 304, respectively. A first path is illustrated by arrow 308 showing input current to the first loop 302 and arrow 310 showing current exiting the first loop 302. The second path is illustrated by arrow 312 showing current input to the second loop 304 and arrow 314 showing current exiting the second loop 304. The heater configuration of FIG. 3A has a resistance of about 56 ohms where the line width, shown by arrow 318, is about 3 micrometers. While the combination of the first and second loops 302, 304 affects the resistance of the heater, the individual loops provide discrete control over other factors.

For example, the first loop 302 is used to control the ABS protrusion contact area. Changing the width 328 of the portion 316 proximate the ABS, changes the size and/or shape of the contact area. The second loop 304 controls the stroke efficiency. The heater is positioned along a crosstrack direction in the slider such that portion 316 is proximate the ABS. For example, if a slider was bisected in a downtrack direction along line of symmetry 322, the first and second loops would appear consistent with those shown in FIG. 2.

The embodiment shown in FIG. 3B has the same configuration as that of FIG. 3A, with the exception of a different line width. FIG. 3B also has second loop 304 positioned within first loop 302 creating open space 306. The double loops are symmetrical about an axis of symmetry substantially perpendicular to the ABS and form parallel resistors. However, the line width, shown by arrow 320, is about 4 micrometers, and the resulting heater 330 resistance is about 40 ohms. In addition to a reduction in resistance, the wider line width also provides increased reliability for the reader heater. Along with altering the line width, further embodiments comprise an altered shape of the first loop.

Similar to FIG. 3A, FIG. 3C shows an embodiment of a reader heater 350 that comprises a first loop 352 positioned around a second loop 354 such that the second loop 354 is located within the first loop 352. Both of the first and second loops 352, 354, are planar and both are positioned in the same plane. The loops 352, 354 create an open space 356 between them. The parallel loops 352, 354 are also symmetrical about an axis 372 substantially perpendicular to the ABS. Thus, a left portion 374 of FIG. 3C is shown as a mirror image of a right portion 376. In certain embodiments, the axis of symmetry 372 is positioned substantially centered over the read element of the slider.

The reduction in resistance occurs due to the division of the current supplied to the reader heater 350 into two paths through the first and second loops 352, 354, respectively. A first path is illustrated by arrow 358 showing input current to the first loop 352 and arrow 360 showing current exiting the first loop 352. The second path is illustrated by arrow 362 showing current input to the second loop 354 and arrow 364 showing current exiting the second loop 354. A difference between the heater configuration of FIG. 3A and that of FIG. 3C is the shape of the first loop 352. Both configurations include a portion 316, 366 oriented in the crosstrack direction in the slider, proximate the ABS, and have the same shape. Also, the first loops 302, 352 of both configurations extend away from the ABS at the ends of the ABS portion 316, 366. However, in FIG. 3C, the first loop 352 includes a portion 378 that then extends substantially parallel to the ABS, back toward the center of the heater (i.e., toward the axis of symmetry 372). This forms an indentation, indicated by arrow 380, in the sides of the heater. The indentation is also formed by a taper in the sides of the heater as they extend away from the ABS. The angle of the taper affects the amount of material forming the heater and therefore at least in part affects the heater's resistance. While the heater configuration of FIG. 3C has a line width, shown by arrow 370, of about 4 micrometers, the heater 350 has a resistance of about 44 ohms.

In addition to an improvement (i.e., reduction) in resistance, double loop reader heater configurations provide further advantages in comparison with a single loop heater. For example, stroke efficiency, various temperatures, and GammaCP may be compared among the various configurations. Gamma CP is the ratio between the transducer's close point movement during heat activation relative to the reader's movement. For example, if the ratio is 1, the reader is the close point since both are moving the same and coincident. If the ratio is greater than 1, the close point is closer to the trailing edge and the reader is slightly recessed. The opposite is the case if the ratio is less than 1. The following table (Table 1) provides various test parameters for the double loop configurations shown in FIGS. 3A-C as compared with a single loop configuration (e.g., a knife configuration).

TABLE 1

| Parameter (unit) | Single Loop | FIG. 3A | FIG. 3B | FIG. 3C |
| --- | --- | --- | --- | --- |
| Stroke Efficiency (A/mW) | 1.40 | 1.1 | 1.09 | 1.09 |
| GammaCP (ratio) | 1.01 | 1.02 | 1.02 | 1.02 |
| Htr Temp Rise Rate (° C./Å) | 2.30 | 1.66 | 1.60 | 1.65 |
| Rdr Temp Rise Rate (° C./Å) | 0.29 | 0.29 | 0.29 | 0.29 |
| ABS Temp Rise Rate (° C./Å) | 0.30 | 0.32 | 0.31 | 0.31 |
| Projected Rdr Temp @Hot (° C.) | 109 | 108 | 108 | 107 |
| Projected Htr Temp @Hot (° C.) | 416 | 312 | 303 | 310 |
| Contact Area (µm$^2$) | 11.1 | 23.1 | 22.3 | 21.6 |
| RHT PTC (mW) | 110.2 | 135.0 | 136.0 | 136.5 |
| RHT Resistance (Ω) | 36 | 56 | 40 | 44 |

The double loop heater configurations of FIGS. 3A-C provide comparable results for the heater resistance in comparison with a knife (single loop of Table 1) configuration and significant reductions in resistance when compared to other single loop configurations (e.g., configurations having a width of the portion proximate the ABS similar to that of FIGS. 3A-C). The table indicates that the double loop configurations will potentially reduce stroke efficiency since the heat sources are further away from the transducer crosstrack centerline. The heater temperature rise rate is dramatically improved with the double loop heater configurations while the reader/ABS temperature rise rates remain flat. As discussed above, reducing the reader temperature is an important design parameter, and the double loop configurations provide a comparable reader temperature rise rate but a significant reduction in heater temperature (Projected Htr Temp @Hot) as compared with the single loop configuration. Also, the contact area increases dramatically with the double loop heater configurations.

Another important design parameter is the size and shape of the contact area generated by the reader heater by protruding the ABS. FIGS. 4A-D are contour diagrams showing the contact area created by various embodiments of an activated reader heater. Each of the diagrams shows the clearance (head to media spacing)/protrusion from the ABS in both the crosstrack and downtrack directions. Several components at the ABS are identified in FIG. 4A, and the same labels apply to each of FIGS. 4A-D. From left-to-right in each diagram are the reader shields 423, the reader contact sensor 427, the first return pole 416, the NFT and write pole tip 412, another contact sensor 411, and the second return pole 403.

Figure 4A:
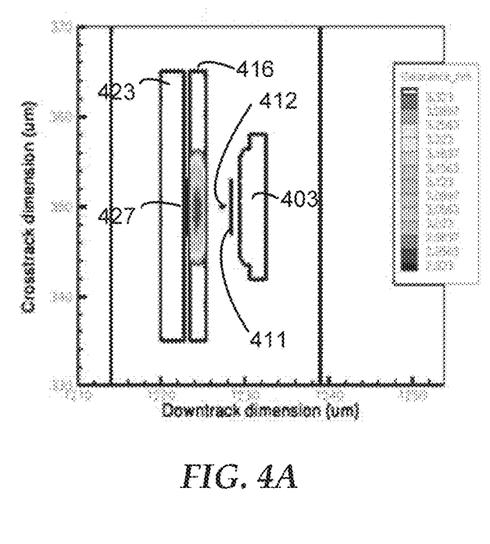
FIG. 4A is a contour view of contact area for the double loop reader heater of FIG. 3A.
Figure 4B:
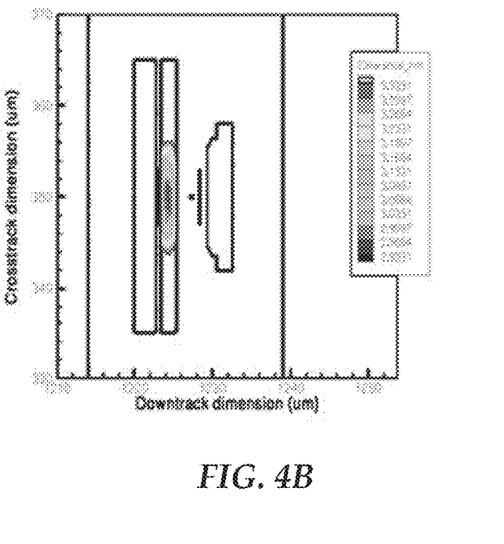
FIG. 4B is a contour view of contact area for the double loop reader heater of FIG. 3B.
Figure 4C:
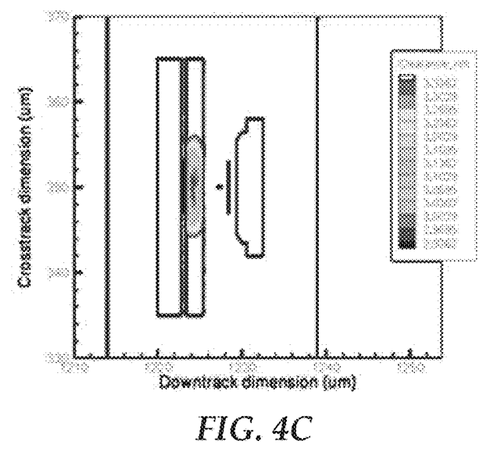
FIG. 4C is a contour view of contact area for the double loop reader heater of FIG. 3C.
Figure 4D:
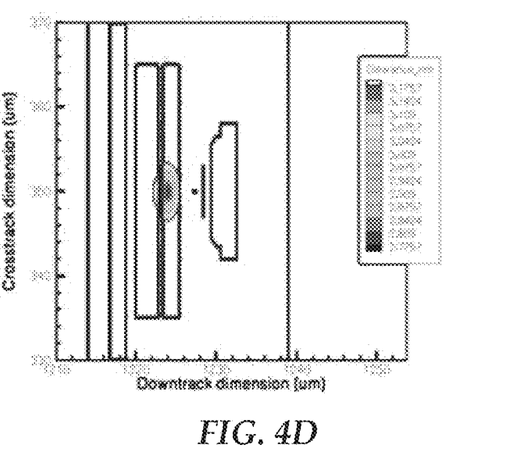
FIG. 4D is a contour view of contact area for a single loop reader heater.

FIG. 4A shows the contact area for a double loop heater configuration as shown in FIG. 3A. Here the contact area extends in the crosstrack direction, has a central portion with a clearance of about 2.9 nm, and is primarily located proximate the first return pole 416. FIG. 4B shows the contact area for a double loop heater configuration as shown in FIG. 3B. The contact area also extends in the crosstrack direction, has a slightly smaller central portion with a clearance of about 2.9 nm, and is primarily located proximate the first return pole 416. FIG. 4C shows the contact area for a double loop heater configuration as shown in FIG. 3C. The contact area again extends in the crosstrack direction, has a slightly less consistently shaped central portion with a clearance of about 2.9 nm, and is primarily located proximate the first return pole 416. For comparison, FIG. 4D shows the contact area for a single loop heater having a knife configuration. Here the contact area is smaller and more focused, has a central portion with a smaller clearance of about 2.7-2.8 nm, and extends across the first return pole 416, the reader contact sensor 427, and the reader shields 423. The contour diagrams illustrate how the width of a first/external loop of a double loop heater influences both the size and shape of the contact area as compared with a narrow (i.e., knife) shaped single loop heater design.

Figure 5A:
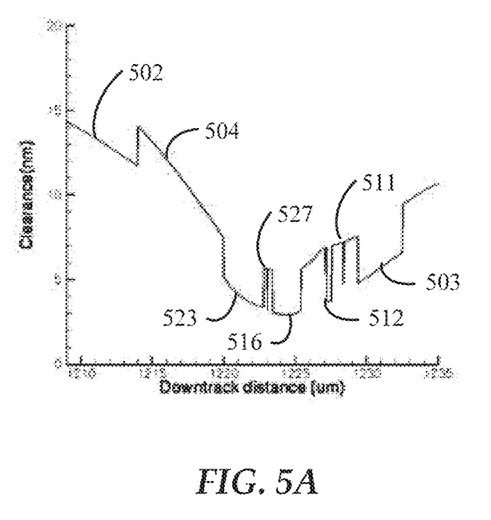
FIG. 5A is an elevation profile of a slider ABS where the slider includes the double loop reader heater of FIG. 3A.
Figure 5B:
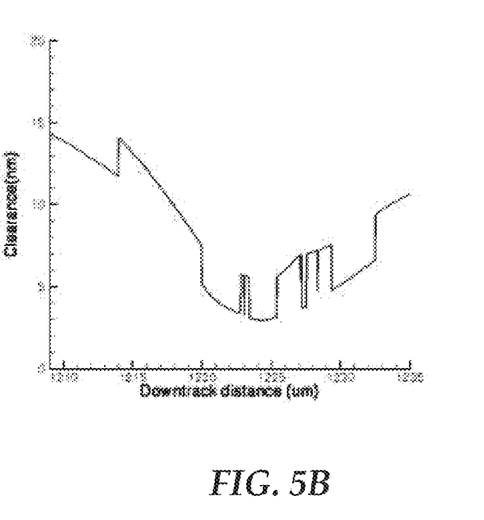
FIG. 5B is an elevation profile of a slider ABS where the slider includes the double loop reader heater of FIG. 3B.
Figure 5C:
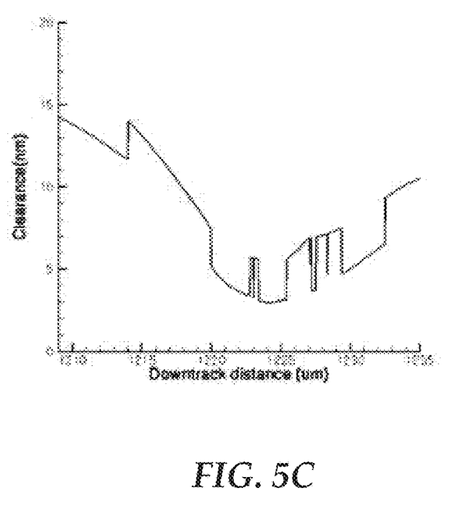
FIG. 5C is an elevation profile of a slider ABS where the slider includes the double loop reader heater of FIG. 3C.
Figure 5D:
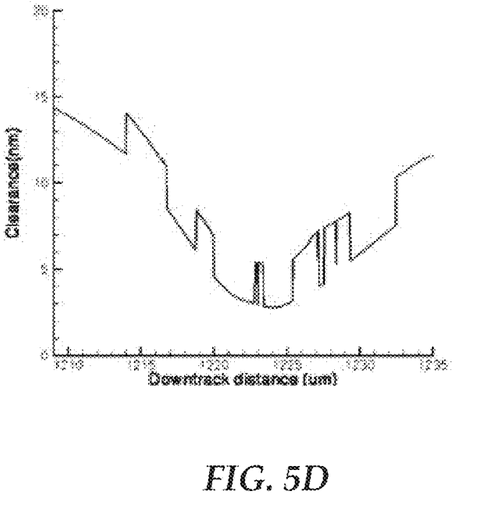
FIG. 5D is an elevation profile of a slider ABS where the slider includes a single loop reader heater.

The differences in contact areas for the respective configurations are further illustrated in the elevation profiles of FIGS. 5A-D. Each of the elevation profiles of FIGS. 5A-D illustrate the same slider components proximate the ABS that are labeled in FIG. 5A. From left-to-right, the components in the downtrack direction are the slider substrate 502, base coat 504, reader shields 523, reader contact sensor 527, first return pole 516, the NFT and pole tip 512, a writer contact sensor 511, and the second return pole 503. FIG. 5A shows the size and shape of the protrusion/contact area for a slider having a reader heater as shown in FIG. 3A. FIG. 5B shows the size and shape of the protrusion/contact area for a slider having a reader heater as shown in FIG. 3B. FIG. 5C shows the size and shape of the protrusion/contact area for a slider having a reader heater as shown in FIG. 3C, and FIG. 5D shows the size and shape of the protrusion/contact area for a slider having a single loop heater with a knife configuration. In addition to the change in clearance among the various configurations, the close point of the contact area also moves as a function of the reader heater configuration when the reader heater is activated. The close point is the position on the protruded ABS that is closest to the recording medium. The close point of a slider can vary depending on which, how many, proximity to the ABS for, or the amount of power supplied to, heat-generating elements that are activated. In addition, the use of materials having high coefficients of thermal expansion such as copper, silver, and 20/80 NiFe can aid in close point control if a heater is used in close proximity.

Figure 6:
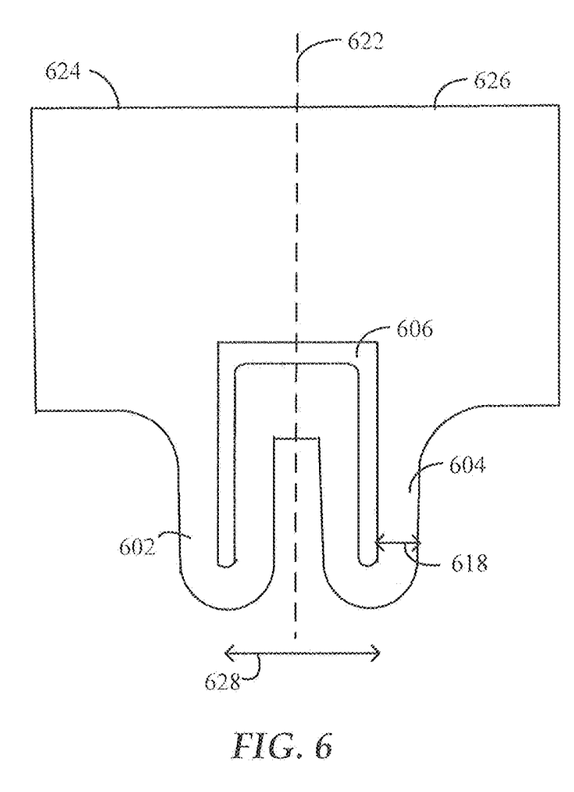
FIG. 6 is a plan view of a double loop reader heater according to embodiments discussed herein.

Another way to control the size/shape of the contact area is to use an alternative reader heater configuration. FIG. 6 illustrates a double loop reader heater with dual loops providing two resistors in parallel. These configurations may typically be used in perpendicular magnetic recording and provide similar advantages as described for the dual loop heater configurations above. The first loop 602 and the second loop 604 are side by side instead of the nested configurations of FIGS. 3A-C. However, similar to the double loop configurations of FIGS. 3A-C, the first loop 602 and second loop 604 are coplanar. The configurations are also similar in that they are symmetrical about an axis 622 substantially perpendicular to the ABS, and the connection points are located on the axis 622. A first half 624 of the reader heater is a mirror image of the second half 626. The dual loops also form an opening in the reader heater 606. As discussed above, the line width 618 of the first and second loops can be varied to control the resistance of the heater. Also, the distance 628 between the loops 602 and 604 (e.g., the close points of each loop) can be varied to control the shape of the contact area/protrusion.

Similar to the nested dual loop heater configurations of FIGS. 3A-C, the dual loop heater configuration of FIG. 6 provides operational advantages over a single loop read heater configuration. The following table (Table 2) provides various test parameters for the double loop configuration shown in FIG. 6 as compared with a single loop configuration (i.e., a baseline configuration).

TABLE 2

| Parameter (unit) | Single Loop | FIG. 6 |
| --- | --- | --- |
| Stroke Efficiency (A/mW) | 1.2 | 1.17 |
| GammaCP (ratio) | 1.00 | 1.00 |
| Htr Temp Rise Rate (° C./Å) | 2.0 | 1.61 |
| Rdr Temp Rise Rate (° C./Å) | 0.40 | 0.37 |
| ABS Temp Rise Rate (° C./Å) | 0.41 | 0.40 |
| Projected Rdr Temp @Hot (° C.) | 94.2 | 91.8 |
| Projected Htr Temp @Hot (° C.) | 211 | 182.5 |
| Contact Area ($\mu m^2$) | 19 | 25.5 |
| RHT PTC (mW) | 66.4 | 62.4 |
| RHT Resistance (Ω) | 43 | 30.4 |

In addition to improved resistance, the parallel double loop heater configuration of FIG. 6 provides the ability to maintain stroke efficiency, increase contact area, and lower reader temperature while significantly lowering the heater temperature. As suggested above, the contact area increases as the distance 628 between the loops 602 and 604 increases. Stroke efficiency will fall slightly as the distance 628 between the loops 602 and 604 increases but not enough to significantly impact operability. Varying the line width 618 also influences the heater temperature rise rate and the overall temperature. For example, wider loop widths 618 (i.e., wider line traces) will reduce the heater temperature and the consequent temperature rise rate.

Figure 7A:
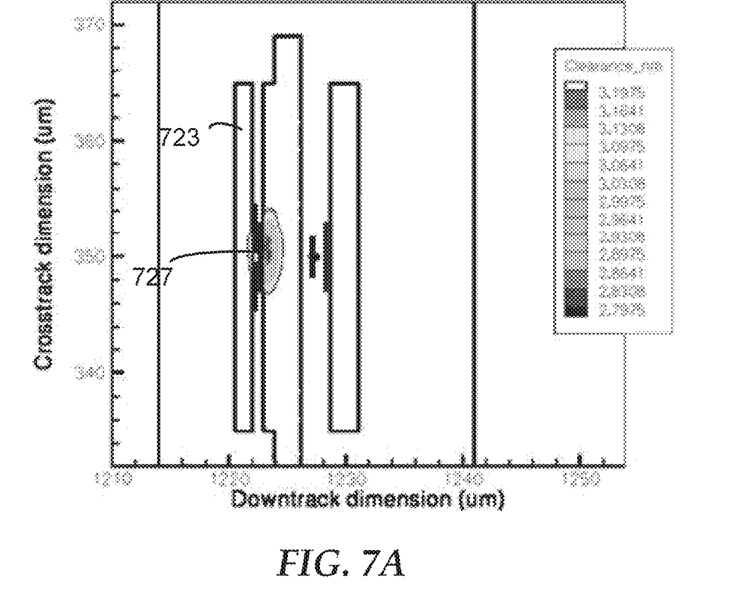
FIG. 7A is a contour view of contact area for a single loop reader heater.
Figure 7B:
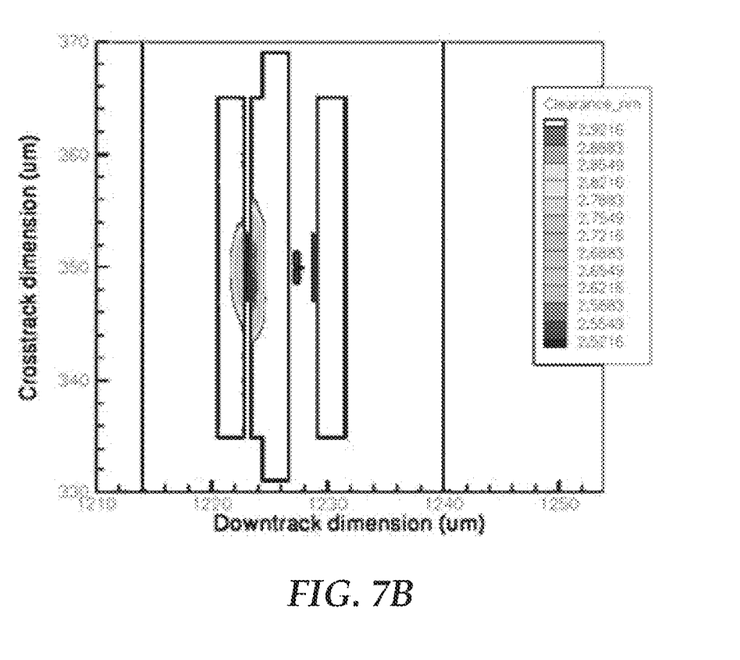
FIG. 7B is a contour view of contact area for the double loop reader heater of FIG. 6.

The size and shape of the contact area generated by the double loop reader heater of FIG. 6 are shown in the contour diagram of FIG. 7B. This may be compared with the contour diagram of a single loop heater configuration (i.e., the baseline configuration of Table 2) of FIG. 7A showing the contact area created by an activated reader heater. The diagrams show the clearance (head to media spacing)/protrusion from the ABS in both the crosstrack and downtrack directions. The reader shields 723 and the reader contact sensor 727 of a slider at the ABS are identified in FIG. 7A, and the same labels apply to the components of FIG. 7B. While the contact areas for both configurations are similarly positioned, the contact area of the double loop reader heater of FIG. 7B is significantly larger in both the crosstrack and downtrack dimensions. Also, the close point, or clearance of the contact area in FIG. 7B is lower/closer to the media (e.g., about 2.52 nm).

Figure 8A:
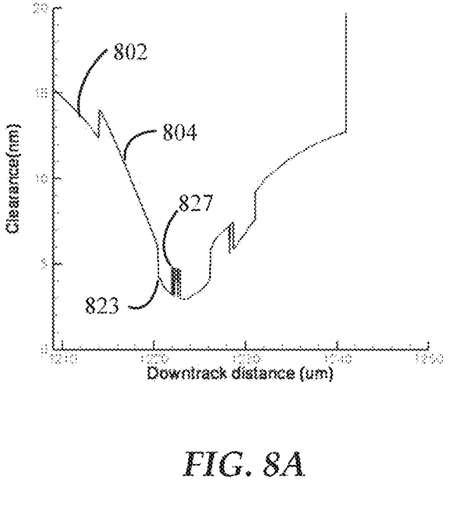
FIG. 8A is a downtrack elevation profile of a slider ABS where the slider includes a single loop reader heater.
Figure 8B:
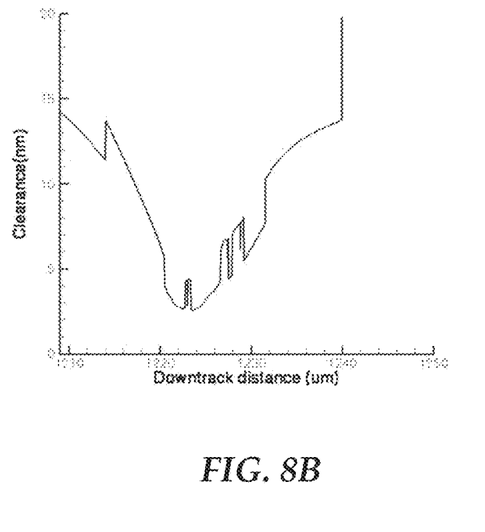
FIG. 8B is a downtrack elevation profile of a slider ABS where the slider includes the double loop reader heater of FIG. 6.
Figure 9A:
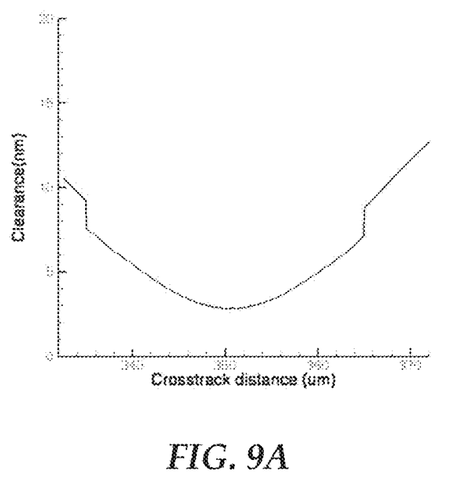
FIG. 9A is a crosstrack elevation profile of a slider ABS where the slider includes a single loop reader heater.
Figure 9B:
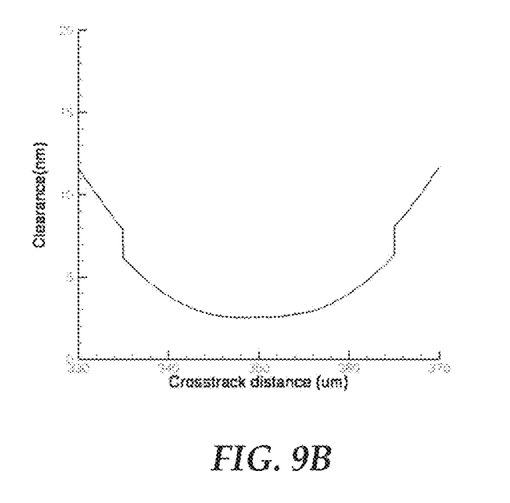
FIG. 9B is a crosstrack elevation profile of a slider ABS where the slider includes the double loop reader heater of FIG. 6.

The differences in contact areas for the two configurations are further illustrated in the elevation profiles of FIGS. 8A-B and 9A-B. FIGS. 8A and 9A illustrate the downtrack and crosstrack, respectively, elevation profiles for the single loop reader heater configuration of Table 2, and FIGS. 8B and 9B illustrate the downtrack and crosstrack, respectively, elevation profiles for the double loop reader heater configuration of FIG. 6. The slider substrate 802, base coat 804, reader shields 823, and reader contact sensor 827 proximate the ABS are identified in FIG. 8A and are the same as the components in FIG. 8B. As discussed above, FIGS. 8A-B illustrate that the double loop reader heater has a lower clearance, and FIGS. 9A-B show that the double loop reader heater generates a broader crosstrack profile (i.e., larger contact area) with a similarly located close point as the single loop reader heater profile in FIG. 9A.

As shown and described above, double loop reader heater configurations, both nested and side-by-side, provide reduced resistance while maintaining other advantages of currently used single loop reader heater configurations. In addition, a parallel (nested) double loop heater configuration provides individual control over stroke efficiency and contact area via the discrete loops. Thus, the size/shape of the contact area can be designed to achieve a balance with the read sensor element temperature using a double loop reader heater.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. An apparatus, comprising:
a slider having an air bearing surface (ABS), the slider comprising:
a reader;
a writer; and
a reader heater configured to cause a protrusion of the ABS proximate the reader, the reader heater comprising a first planar loop and a second planar loop wherein the first and second loops are in the same plane, each loop extends toward the ABS from a shared base portion, and each loop has a rounded portion at the point of the loop closest to the ABS.

2. The apparatus of claim 1, wherein the reader heater has a symmetrical shape about an axis of symmetry perpendicular to the ABS, the first planar loop is positioned on a first side of the axis of symmetry, and the second planar loop is positioned on the opposing side of the axis of symmetry.

3. The apparatus of claim 1, wherein the first and second loops are U-shaped.

4. The apparatus of claim 1, wherein the first and second loops are resistors in parallel.

5. The apparatus of claim 1, wherein the first and second loops form a U-shaped opening in the reader heater.

6. The apparatus of claim 5, wherein each of the first and second loops have a material width between the opening and an outer edge of the loop, and the material width determines the resistance of the reader heater.

7. The apparatus of claim 1, wherein each of the first and second loops has a close point at the point of the loop closest to the ABS and the distance between the close points determines the shape of the protrusion.

8. The apparatus of claim 1, wherein the first and second planar loops are electrically and dimensionally parallel to each other.

9. The apparatus of claim 1, wherein the slider is configured for perpendicular magnetic recording.

10. An apparatus, comprising:
a slider having an air bearing surface (ABS), the slider comprising:
a reader;
a writer; and
a reader heater configured to cause a protrusion of the ABS proximate the reader, the reader heater having a symmetrical shape about an axis of symmetry perpendicular to the ABS, the reader heater comprising a first planar loop and a second planar loop wherein the first and second loops are in the same plane, each loop extends toward the ABS from a shared base portion, and each loop has a rounded portion at the point of the loop closest to the ABS.

11. The apparatus of claim 10, wherein the second loop is a mirror image of the first loop.

12. The apparatus of claim 10, wherein the first and second loops are U-shaped.

13. The apparatus of claim 10, wherein the first and second loops are resistors in parallel.

14. The apparatus of claim 10, wherein the first and second loops form a U-shaped opening in the reader heater.

15. The apparatus of claim 14, wherein each of the first and second loops have a material width between the opening and an outer edge of the loop, and the material width determines the resistance of the reader heater.

16. The apparatus of claim 10, wherein each of the first and second loops has a close point at the point of the loop closest to the ABS and the distance between the close points determines the shape of the protrusion.

17. The apparatus of claim 10, wherein the first and second planar loops are electrically and dimensionally parallel to each other.

18. The apparatus of claim 10, wherein the slider is configured for perpendicular magnetic recording.

19. An apparatus, comprising:
a slider having an air bearing surface (ABS), the slider comprising:
a reader;
a writer; and
a reader heater configured to cause a protrusion of the ABS proximate the reader, the reader heater comprising a first planar loop and a second planar loop wherein the first and second loops are in the same plane, each loop extends toward the ABS from a shared base portion such that the protrusion has an area larger than an area of a protrusion formed by a single loop reader heater, and each loop has a rounded portion at the point of the loop closest to the ABS.

20. The apparatus of claim 19, wherein the reader heater has a resistance less than a resistance of a reader heater having a single loop.

* * * * *